United States Patent
Kaji et al.

(10) Patent No.: US 12,491,054 B2
(45) Date of Patent: Dec. 9, 2025

(54) DATA PROCESSING DEVICE, DATA PROCESSING METHOD, AND RECORDING MEDIUM STORING PROGRAM FOR COMPARING THREE-DIMENSIONAL DATA OF TEETH CAPTURED AT DIFFERENT TIMINGS

(71) Applicant: J. MORITA MFG. CORP., Kyoto (JP)

(72) Inventors: Ryosuke Kaji, Kyoto (JP); Mikinori Nishimura, Kyoto (JP)

(73) Assignee: J. MORITA MFG. CORP., Kyoto (JP)

( * ) Notice: Subject to any disclaimer, the term of this patent is extended or adjusted under 35 U.S.C. 154(b) by 465 days.

(21) Appl. No.: 17/979,041

(22) Filed: Nov. 2, 2022

(65) Prior Publication Data

US 2023/0135700 A1    May 4, 2023

(30) Foreign Application Priority Data

Nov. 2, 2021 (JP) .................................. 2021-179194

(51) Int. Cl.
*A61C 9/00* (2006.01)
*A61C 13/00* (2006.01)

(52) U.S. Cl.
CPC ........ *A61C 9/0053* (2013.01); *A61C 13/0004* (2013.01)

(58) Field of Classification Search
CPC ... A61C 9/0053; A61C 13/0004; A61C 7/002; A61C 19/04; G06T 2207/10081;
(Continued)

(56) References Cited

U.S. PATENT DOCUMENTS

2002/0102521 A1   8/2002   Iiyama et al.
2013/0044932 A1   2/2013   Caligor et al.
(Continued)

FOREIGN PATENT DOCUMENTS

EP    3 819 871 A1    5/2021
JP    2002-224143 A    8/2002
(Continued)

OTHER PUBLICATIONS

Japanese Office Action issued Aug. 8, 2023 in Japanese Patent Application No. 2021-179194 (with unedited computer-generated English translation), 10 pages.
(Continued)

*Primary Examiner* — Christopher Wait
(74) *Attorney, Agent, or Firm* — Oblon, McClelland, Maier & Neustadt, L.L.P.

(57) ABSTRACT

A technique that allows a dentist to accurately grasp movement of individual teeth tooth. A data processing device processes three-dimensional data of teeth. The data processing device includes an input unit to which the three-dimensional data including a bone of a part of a head and a plurality of teeth captured by an X-ray CT imaging device is input, a data processor that performs data processing based on the three-dimensional data input to the input unit, and an output unit that outputs the three-dimensional data processed by the data processor to an external device. The three-dimensional data further includes position information and is segmented into the bone of the part of the head and the plurality of teeth. The data processor compares the three-dimensional data captured at different timings based on a reference provided on at least the bone of the part of the head.

20 Claims, 14 Drawing Sheets

(58) Field of Classification Search
CPC ............. G06T 2207/30036; G06T 7/20; G06T 7/0012; A61B 6/51; A61B 6/5217
See application file for complete search history.

(56) References Cited

U.S. PATENT DOCUMENTS

| | | | |
|---|---|---|---|
| 2013/0094740 | A1 | 4/2013 | Vandenberghe |
| 2014/0272772 | A1 | 9/2014 | Andreiko et al. |
| 2016/0135925 | A1* | 5/2016 | Mason .................... A61C 7/002 703/2 |
| 2017/0049311 | A1 | 2/2017 | Borovinskih et al. |
| 2019/0125493 | A1 | 5/2019 | Salah et al. |
| 2019/0228255 | A1 | 7/2019 | Borovinskih et al. |
| 2020/0281697 | A1* | 9/2020 | Brandt .................... G16H 30/20 |
| 2021/0082184 | A1 | 3/2021 | Claessen et al. |
| 2021/0169318 | A1 | 6/2021 | Sorimoto et al. |
| 2021/0307882 | A1 | 10/2021 | Wang et al. |
| 2021/0312220 | A1 | 10/2021 | Borovinskih et al. |

FOREIGN PATENT DOCUMENTS

| | | |
|---|---|---|
| JP | 2018-520804 A | 8/2018 |
| JP | 2019-86712 A | 6/2019 |
| JP | 2020-503919 A | 2/2020 |
| JP | 2021-508114 A | 2/2021 |
| WO | WO 2009/143417 A1 | 11/2009 |
| WO | WO 2011/154559 A1 | 12/2011 |
| WO | WO 2018/118200 A1 | 6/2018 |

OTHER PUBLICATIONS

Extended European Search Report issued Apr. 6, 2023, in corresponding European Patent Application No. 22203890.3, 10 pages.
Japanese Office Action issued Dec. 19, 2023 in Japanese Patent Application No. 2021-179194 (with unedited computer-generated English translation), 8 pages.
Takahashi et al., "Radiographic Analyses of Quantitative Bone Change around a Dental Implant by the Digital Subtraction Technique: Alteration of Bone Level in the Period before Second Surgery and after First Surgery", Journal of Japanese Society of Oral Implantology, 2014, vol. 27, No. 3, pp. 360-369 (with English Abstract).
Terajima et al., "Three-dimensional analysis system for orthognathic surgery patients with jaw deformities", American Journal of Orthodontics and Dentofacial Orthopedics, 2008, vol. 134, No. 1, pp. 100-111.
Japanese Office Action issued on May 14, 2024 in Japanese Patent Application No. 2021-179194 (with unedited computer-generated English translation), 9 pages.
Masashi Makino, "[Most Important], What is cephalography for precise examination?", Jan. 4, 2017, Makino Orthodontic Clinic, Retrieved on Sep. 17, 2025, <https://makino-ortho.com/archives/2665> (11 pages).
Office Action dated Oct. 21, 2025, issued in counterpart JP Application No. 2021-179194, with English Translation, citing documents No. 23. (10 pages).

* cited by examiner

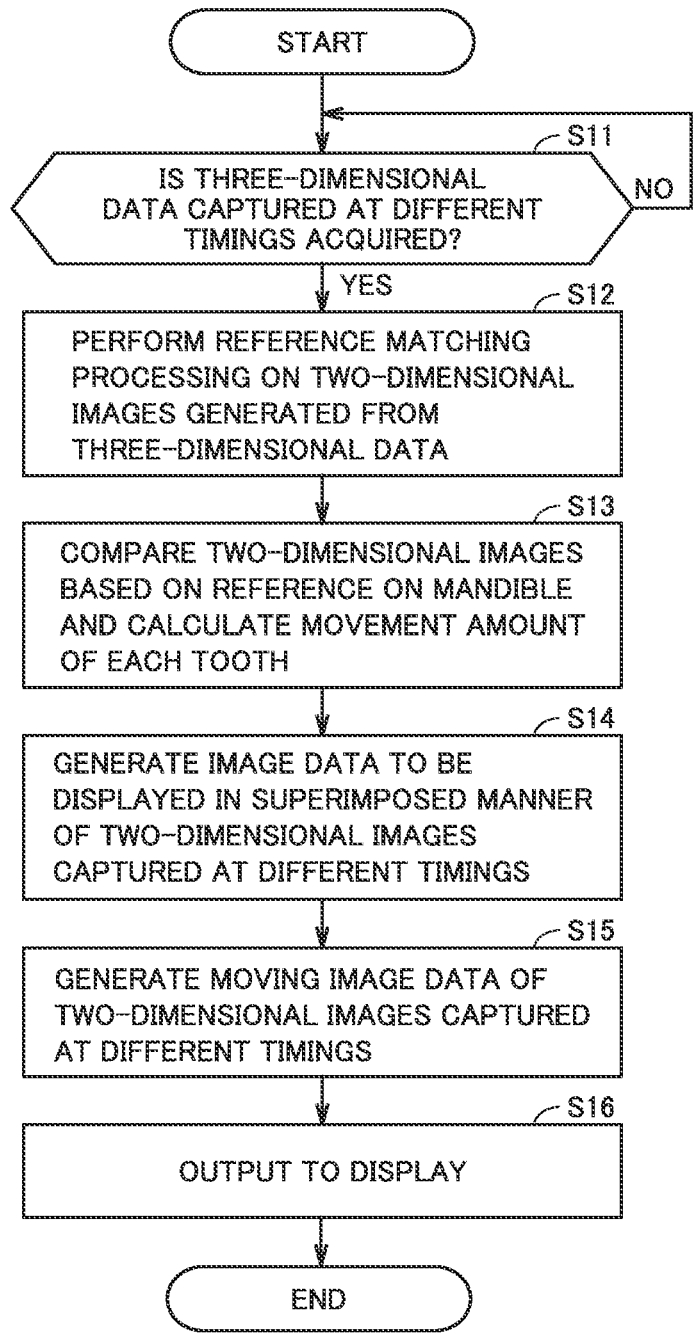

DATA PROCESSING DEVICE, DATA PROCESSING METHOD, AND RECORDING MEDIUM STORING PROGRAM FOR COMPARING THREE-DIMENSIONAL DATA OF TEETH CAPTURED AT DIFFERENT TIMINGS

CROSS-REFERENCE TO RELATED APPLICATIONS

This application claims priority under 35 U.S.C. § 119 from Japanese Patent Application No. 2021-179194, filed Nov. 2, 2021. The entire content of the above application is incorporated herein by reference.

BACKGROUND

Field

The present disclosure relates to a data processing device, a data processing method, and a recording medium. storing a program.

Description of the Background Art

In orthodontics treatment, for example, a brace having an archwire interface is attached to each tooth and applies pressure to each tooth via an archwire. Orthodontics is performed by applying pressure to each tooth via the archwire to move the tooth to a desired position. Japanese National Patent Publication No. 2020-503919 discloses a system that makes a plan such as selection of an orthodontics component and a position of the orthodontics component based on a digital model of a dentition including each tooth.

SUMMARY

As disclosed in Japanese National Patent Publication No. 2020-503919, a treatment plan for positioning at least one tooth in a subject's dentition at a desired position is determined using a digital model obtained by scanning the dental arch of the subject. In particular, a dentist compares the treatment plan with the subject's actual tooth movement to determine whether they correlate with one another. Japanese National Patent Publication No. 2020-503919, however, discloses only grasping the tooth movement by comparison with the digital model, but does not specifically disclose quantitatively grasping how much the position of each tooth has changed before and after orthodontics.

The present disclosure has been made to solve such a problem, and it is therefore an object of the present disclosure to provide a technique of enabling a dentist to accurately grasp movement of each tooth.

A data processing device according to an aspect of the present disclosure is a data processing device that processes three-dimensional data of teeth. The data processing device includes an input circuit into which the three-dimensional data including a bone of a part of a head and a plurality of teeth captured by an imaging device is input, a data processing circuit that performs data processing based on the three-dimensional data input to the input circuit, and an output circuit that outputs the three-dimensional data processed by the data processing circuit to an external device. The three-dimensional data further includes position information and is segmented into at least the bone of the part of the head and the plurality of teeth. The data processing circuit compares the three-dimensional data captured at different timings based on a reference provided on at least the bone of the part of the head.

A data processing method according to an aspect of the present disclosure is a data processing method for processing three-dimensional data of teeth. The data processing method includes inputting the three-dimensional data including a bone of a part of a head and a plurality of teeth captured by an imaging device, comparing the three-dimensional data captured at different timings based on a reference provided on at least the bone of the part of the head, and outputting the three-dimensional data subjected to the comparing to an external device. The three-dimensional data further includes position information and is segmented into at least the bone of the part of the head and the plurality of teeth.

A recording medium storing a program according to an aspect of the present disclosure is a recording medium storing program executed by a data processing device that processes three-dimensional data of teeth. The recording medium storing a program includes inputting the three-dimensional data including a bone of a part of a head and a plurality of teeth captured by an imaging device, comparing the three-dimensional data captured at different timings based on a reference provided on at least the bone of the part of the head, and outputting the three-dimensional data subjected to the comparing to an external device. The three-dimensional data further includes position information and is segmented into at least the bone of the part of the head and the plurality of teeth.

The foregoing and other objects, features, aspects and advantages of the present disclosure will become more apparent from the following detailed description of the present disclosure when taken in conjunction with the accompanying drawings.

BRIEF DESCRIPTION OF THE DRAWINGS

FIG. 3 is a flowchart for describing an example of data processing performed in the data processing device according to the first embodiment.

DETAILED DESCRIPTION OF THE EMBODIMENTS

Figure 1:
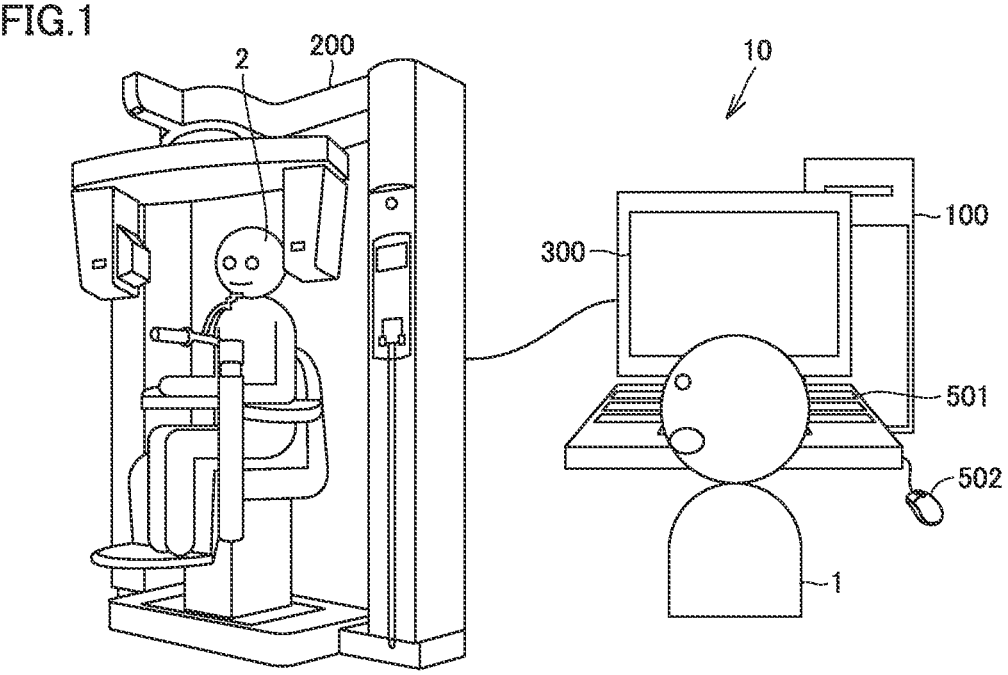
FIG. 1 is a diagram schematically illustrating an application example of a data processing device according to a first embodiment.

Embodiments of the present disclosure will be described in detail with reference to the drawings. Note that the same or corresponding parts in the drawings are denoted by the same reference numerals, and no redundant description will be given of such parts.

First Embodiment

Figure 2:
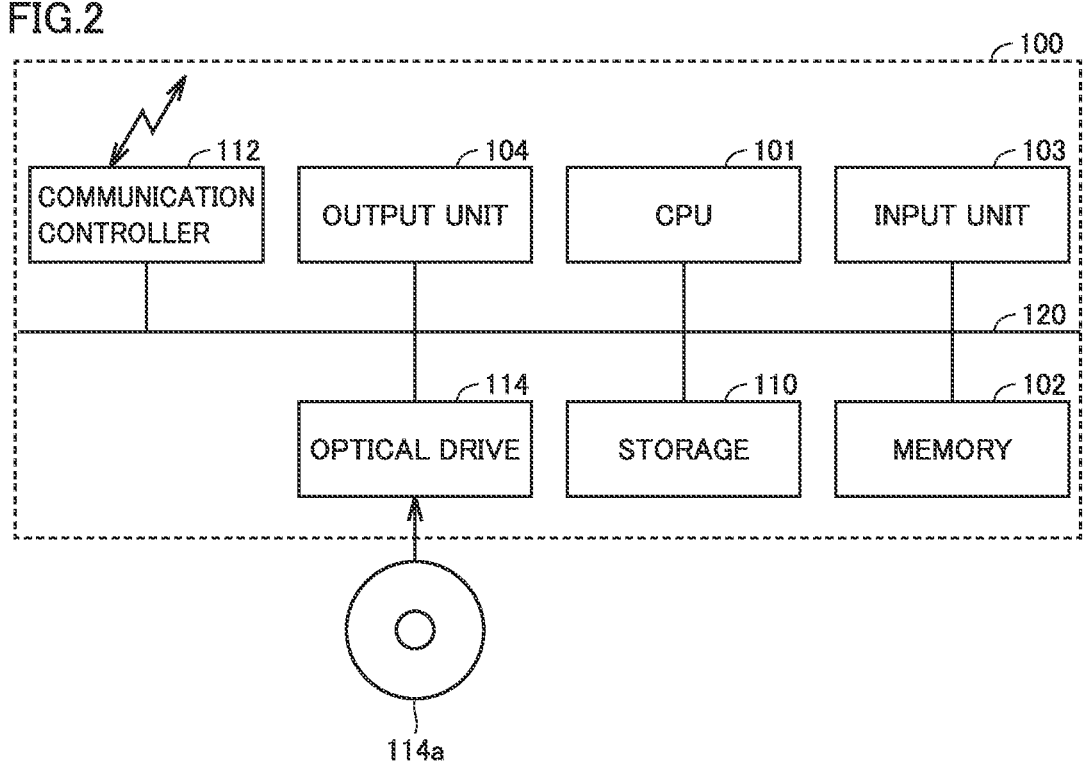
FIG. 2 is a diagram schematically illustrating an example of a hardware configuration of the data processing device according to the first embodiment.

With reference to FIGS. 1 and 2, a description will be given of an example of an inspection system to which a data processing device according to a first embodiment is applied. FIG. 1 is a diagram schematically illustrating an application example of a data processing device 100 according to the first embodiment. FIG. 2 is a diagram schematically illustrating an example of a hardware configuration of a data processing device 100 according to the first embodiment.

As illustrated in FIG. 1, a user 1 can acquire data (hereinafter, also referred to as "three-dimensional data") of a three-dimensional image including teeth of a subject 2 using an inspection system 10. Note that the "user" may be any person who uses the inspection system 10, such as, for example, an operator, a dentist, a dental assistant, a teacher or student of a dental university, a dental technician, an engineer of a manufacturer, or a worker of a manufacturing factory. The "subject" may be any person whose is subject to the inspection system 10, such as a patient in a dentist's office or a subject in a dental university.

An inspection system 10 according to the first embodiment comprises an X-ray CT scanner 200, a data processing device 100, and a display 300. An X-ray CT scanner 200 performs an X-ray computerized tomography (CT) scan by irradiating the subject 2 with X-rays to collect projection data and reconstructing the projection data thus obtained on a computer to generate a CT image. Specifically, with the subject 2 positioned between an X-ray generator and an X-ray detector, the X-ray CT scanner 200 turns the X-ray generator and the X-ray detector around the subject 2 while the X-ray generator is irradiating the subject 2 with cone-shaped X-rays (X-ray cone beam). The X-ray CT scanner 200 collects a detection result (projection data) of X-rays detected by the X-ray detector, generates X-ray imaging information from the detection result (projection data) of X-rays thus collected, and reconstructs three-dimensional data. The three-dimensional data includes at least a part of a maxilla and a mandible and a plurality of teeth of the subject 2.

For example, a user 1 acquires three-dimensional data including the teeth by taking an image of a subject 2 with an X-ray CT scanner 200 in order to observe the position of each tooth before and after orthodontic treatment is performed on the subject 2. In particular, the user 1 can easily make a treatment plan such as an adjustment to an orthodontic component by quantitatively grasping a change in position of each tooth due to orthodontics.

The position of each tooth relatively changes due to orthodontics and the shape of gingiva also relatively changes accordingly, so that, even if it is obvious that the position of each tooth has changed, the movement amount of each tooth and the like cannot be quantitatively grasped with high accuracy only by simply comparing the three-dimensional data captured before and after orthodontics.

Therefore, a data processing device 100 according to the first embodiment provides a reference on the maxilla or the mandible using three-dimensional data segmented into at least a part of the maxilla and the mandible and the plurality of teeth, and performs data processing of comparing, based on the reference, the three-dimensional data (including a two-dimensional image generated based on the three-dimensional data) captured at different timings. Note that the segmentation processing on at least a part of the maxilla and the mandible and the plurality of teeth may be automatically performed as preprocessing of the data processing device 100, or may be manually performed by a user 1 or the like. Further, the plurality of teeth may be segmented in a manner as to make each tooth identifiable, or may be collectively segmented into predetermined units. Here, the reference may be any bone that does not change between capture timings (for example, before and after orthodontics), and may be a bone of a part of a head. The bone of the part of the head includes at least any one of a mandible, a maxilla, a nasal bone, a zygomatic bone, a nasal cavity, a frontal bone, a temporal bone, or a temporal fossa.

As illustrated in FIG. 2, a data processing device 100 includes, as primary hardware components, a central processing unit (CPU) 101, a memory 102, an input unit (input circuit) 103, an output unit (output circuit) 104, storage 110, a communication controller 112, and an optical drive 114. Such components are connected over a processor bus 120.

A CPU 101 can read a program (for example, an operating system (OS) and a data processing program) stored in storage 110, load the program into memory 102, and execute the program. The CPU 101 may execute various programs read from storage 110. Specifically, the data processing program performs predetermined data processing on three-dimensional data input to the input unit 103, compares the three-dimensional data (including a two-dimensional image generated based on the three-dimensional data) captured at different timings based on the reference provided on the maxilla or the mandible to obtain the movement amount of each tooth, and displays a change in the three-dimensional data before and after orthodontics as a moving image. The CPU 101 that executes a program corresponds to a data processor (data processing circuit) of the data processing device 100.

Memory 102 provides a storage area where program code, working memory, and the like are temporarily stored when the CPU 101 executes a program. Memory 102 includes a volatile memory device such as dynamic random-access memory (DRAM) or static random-access memory (SRAM).

The input unit 103 includes an input interface that is connected to an X-ray CT scanner 200 to receive three-dimensional data from the X-ray CT scanner 200. Further, input devices such as a keyboard 501 and a mouse 502 illustrated in FIG. 1 are connected to the input unit 103 to allow the input unit 103 to receive information selected by a user 1.

The output unit 104 is an interface for establishing a connection with an external device and is connected to a display 300 that is an example of the external device. The output unit 104 may include a graphics processing unit (GPU) that generates an image to be displayed on the display 300. The display 300 includes, for example, a liquid crystal display (LCD) or an organic electroluminescence (ELD) display.

Storage 110 stores a program for providing functions corresponding to a data processing device 100 in addition to an OS for implementing basic functions. Storage 110 further stores input three-dimensional data and an operation result (for example, moving image data representing the movement amount of each tooth, a change in three-dimensional data before and after orthodontics, and the like) obtained as a result of data processing. Storage 110 includes, for example, a non-volatile memory device such as a hard disk or a solid state drive (SSD).

The communication controller 112 transmits and receives data to and from a device, a server device, or the like installed in a dentist's office over a network. The communication controller 112 is compatible with any communication system such as Ethernet (registered trademark), a wireless local area network (LAN), and Bluetooth (registered trademark). Note that when the operation result obtained as a result of data processing performed by a CPU 101 is output to an external device such as a server device, the communication controller 112 also functions as an output unit (output circuit) that outputs three-dimensional data processed by the data processor to the external device.

The data processing device 100 includes optical drive 114, and a computer-readable program stored in a non-transitory recording medium 114*a* (for example, an optical recording medium such as a digital versatile disc (DVD)) may be read from the recording medium and installed in storage 110 or the like.

A program executed on a data processing device 100 may be installed via a computer-readable recording medium 114*a*, or may be downloaded from a server device or the like on a network and then installed. Further, functions provided by a data processing device 100 according to the present embodiment may be implemented via some of the modules provided by the OS.

[Data Processing]

Next, data processing performed by the data processing device 100 on three-dimensional data captured at different timings will be described with reference to the flowchart. FIG. 3 is a flowchart for describing an example of data processing performed in a data processing device 100 according to the first embodiment.

First, a data processing device 100 acquires three-dimensional data captured at different timings (step S11). When failing to acquire three-dimensional data (NO in step S11), the data processing device 100 returns to step S11 and goes into a state of waiting for acquisition of three-dimensional data. Specifically, the data processing device 100 acquires three-dimensional data (first three-dimensional data) captured before orthodontics is performed on a subject 2, and three-dimensional data (second three-dimensional data) captured after orthodontics from storage 110 that stores three-dimensional data captured by X-ray CT scanner 200. Note that, in the following, for the sake of simplicity, an example where two pieces of three-dimensional data captured before and after orthodontics are processed by a data processing device 100 will be described, but the present disclosure is not limited to such an example, and a plurality of pieces of three-dimensional data captured during orthodontics may be processed by a data processing device 100. Further, the second three-dimensional data only needs to be three-dimensional data captured later than the first three-dimensional data, and is not limited to three-dimensional data captured after the end of orthodontics and may be three-dimensional data captured in the middle of orthodontics.

Figure 4A:
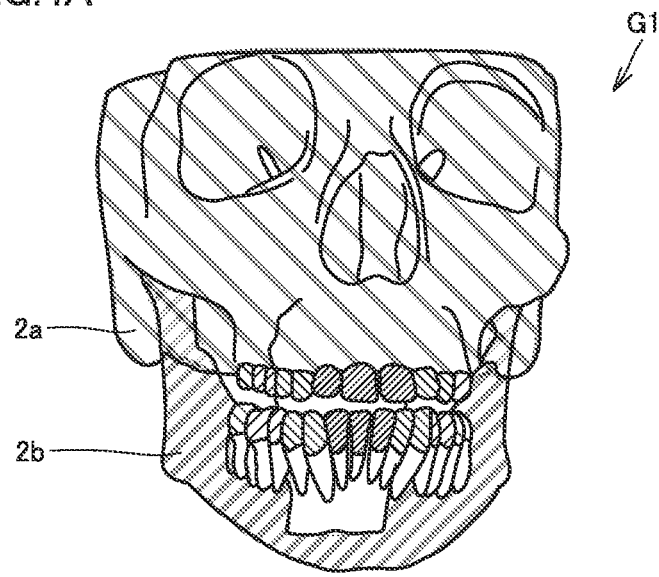
FIG. 4A is a diagram illustrating an example of three-dimensional data processed by the data processing device according to the first embodiment.
Figure 4B:
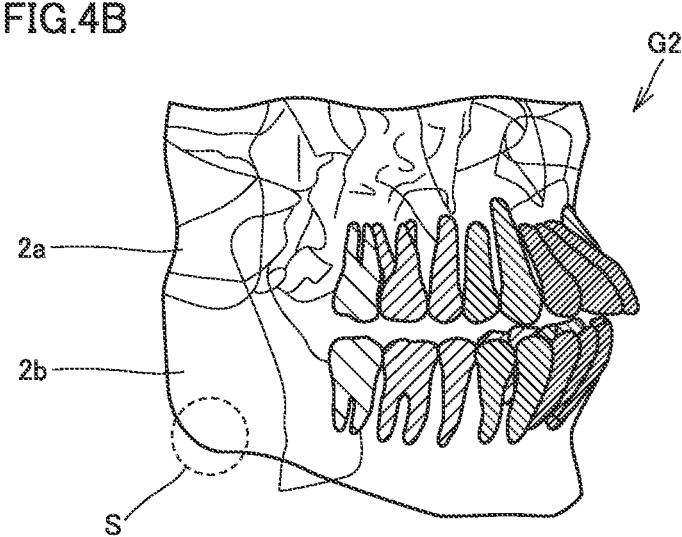
FIG. 4B is a diagram illustrating an example of three-dimensional data processed by the data processing device according to the first embodiment.

The three-dimensional data acquired in step S11 includes at least a part of the maxilla and the mandible, and the plurality of teeth. FIGS. 4A and 4B are diagrams illustrating examples of three-dimensional data processed by a data processing device 100 according to the first embodiment. Three-dimensional data G1 illustrated in FIG. 4A is three-dimensional data when subject 2 is viewed from the front. In three-dimensional data G1, a plurality of pieces of position information are segmented for each part, and specifically, a maxilla 2*a*, a mandible 2*b*, and the plurality of teeth are each associated with identification data so as to be distinguishable from each other. In FIG. 4A, how the segmentation is performed is illustrated with maxilla 2*a*, mandible 2*b*, and the plurality of teeth hatched. Although FIG. 4A includes not only maxilla 2*a* but also other bones such as a nasal bone and a frontal bone, the segmentation only needs to make each tooth, mandible 2*b*, and at least a bone including maxilla 2*a* other than each tooth and mandible 2*b*, distinguishable from each other.

FIG. 4B is a two-dimensional image G2 of a bone including teeth of a subject 2 when the subject 2 is viewed from a side point, with two-dimensional image G2 being generated based on three-dimensional data. Note that imaging data captured by a X-ray CT scanner 200 is voxel data (three-dimensional data) representing an XYZ space, and a two-dimensional image viewed from any point can be generated and displayed based on the three-dimensional data. Further, it is possible to generate and display, based on the three-dimensional data, two-dimensional images viewed from any various points selected by the user. That is, a data processing device 100 can process the three-dimensional data that is material to generate a two-dimensional image viewed from a desired point.

In a case where two-dimensional images generated from three-dimensional data captured before and after orthodontics, even if it is obvious that the position of each tooth has changed, it is not possible to quantitatively grasp the movement amount of each tooth and the like with high accuracy only by simple comparison. Therefore, a data processing device 100 may provide a reference on maxilla 2*a* or mandible 2*b* whose position does not change even when orthodontics is performed, and quantitatively grasp the position of each tooth by comparing two-dimensional images captured before and after orthodontics based on the reference. In two-dimensional image G2, as illustrated in FIG. 4B, a reference "S" is provided at a characteristic portion of mandible 2*b*. Note that, in FIG. 4B, hatching of maxilla 2*a* and mandible 2*b* is removed in order to make the position of reference "S" clearly visible.

Reference "S" is not necessarily provided on mandible 2*b*, but may be provided on maxilla 2*a* or may be provided on both maxilla 2*a* and mandible 2*b*. Furthermore, reference "S" is not necessarily provided on a part of maxilla 2*a* or mandible 2*b*, but may be provided on the whole of maxilla 2*a* or mandible 2*b*. When reference "S" is provided on both maxilla 2*a* and mandible 2*b*, data processing device 100 compares, for each tooth on the maxilla 2*a* side, two-dimensional images based on reference "S" (first reference) provided on maxilla 2*a*, and compares, for each tooth on the mandible 2*b* side, the two-dimensional images based on reference "S" (second reference) provided on mandible 2*b*.

When succeeding in acquiring three-dimensional data (YES in step S11), the data processing device 100 performs reference matching processing on the three-dimensional data thus acquired (step S12). In the reference matching processing, the data processing device 100 generates two-dimensional images viewed from an identical point for two pieces of the three-dimensional data acquired in step S11, the two pieces of three-dimensional data being captured at different timings. The data processing device 100 identifies reference "S" on either mandible 2*b* or maxilla 2*a* in the two two-dimensional images thus generated and performs reference matching of the two two-dimensional images based on reference "S" thus identified. Note that reference "S" may be automatically identified by a program. For example, in a case where reference "S" is a chin of mandible 2*b*, a human jaw has a uniform shape, so that it is possible to identify the chin by pattern matching. Further, user operation may be partially involved in identifying reference "S". For example, any region of maxilla 2*a* or mandible 2*b* in the two two-dimensional images may be set as reference "S" in accordance with user input. Further, a bone itself such as segmented mandible 2*b* or maxilla 2*a* may be used as a reference without identifying reference "S". Bones other than teeth rarely change in shape before and after orthodontics, such a bone other than the teeth in the two two-dimensional images may be identified by pattern matching and used as a reference for the reference matching processing.

Next, a data processing device 100 compares the two two-dimensional images, subjected to the position matching based on reference "S", on mandible 2*b* in step S11, and calculates the movement amount of each tooth (step S13). Specifically, the data processing device 100 matches the two-dimensional image captured before orthodontics with the two-dimensional image captured after orthodontics based on reference "S", compares the positions of each tooth, and calculates the movement amount of each changed tooth. For example, the data processing device 100 can calculate the movement amount of each changed tooth by calculating a difference value between the two-dimensional image captured before orthodontics and the two-dimensional image captured after orthodontics. In particular, with position information on the plurality of teeth segmented, the data processing device 100 can accurately grasp the movement of each tooth by calculating a difference value between positions before and after orthodontics for each segmented tooth. Here, the movement amount of each tooth may be an average value of movement amounts of voxel data (three-dimensional data) representing each tooth, or may be a movement amount of the center of voxel data (three-dimensional data) corresponding to the center point of each tooth.

Figure 5:
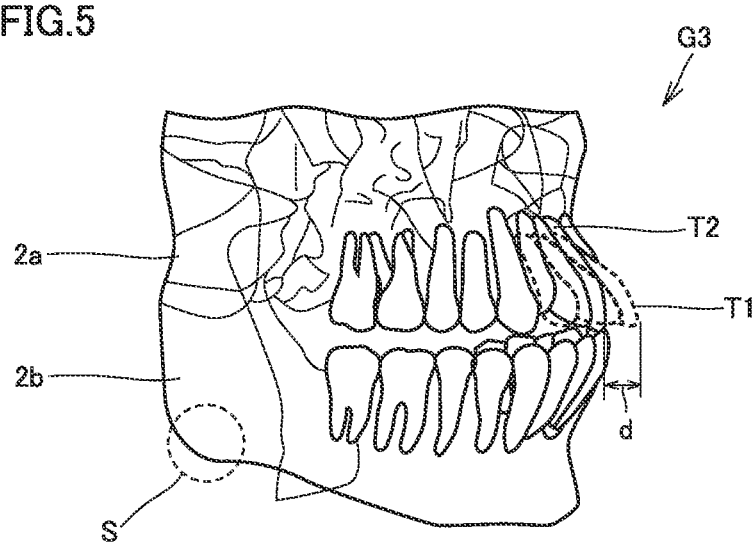
FIG. 5 is a diagram illustrating an example of image data displayed in a superimposed manner, the image data being generated by the data processing device according to the first embodiment.

Next, a data processing device 100 generates image data representing two-dimensional images captured at different timings in a superimposed manner (step S14). Specifically, the data processing device 100 matches the two-dimensional image captured before orthodontics with the two-dimensional image captured after orthodontics based on reference "S" and superimposes the two-dimensional images on top of one another to generate image data in which a position before orthodontics is represented by a dashed line. FIG. 5 is a diagram illustrating an example of image data G3 displayed in a superimposed manner, image data G3 being generated by data processing device 100 according to the first embodiment. Image data G3 is image data when a subject 2 is viewed from a side and is image data obtained by superimposing the two-dimensional image captured before orthodontics on the two-dimensional image captured after orthodontics based on reference "S". Image data G3 allows a change from a tooth T1 before being subjected to orthodontics to a tooth T2 after being subjected to orthodontics to be easily grasped. Further, the positions of the two-dimensional images captured before and after orthodontics are adjusted based on reference "S", so that a distance between tooth T1 and tooth T2 illustrated in FIG. 5 can be calculated as a movement amount of the changed tooth.

Next, a data processing device 100 generates moving image data of the two-dimensional images captured at different timings (step S15). Specifically, in a case where a plurality of two-dimensional images are acquired over a period from before orthodontics to after orthodontics, the data processing device 100 generates moving image data by continuously displaying the two-dimensional images at predetermined time intervals with their respective references "S" of the two-dimensional images matched with each other. Note that, in a case where only two two-dimensional images before and after orthodontics are acquired, the data processing device 100 may generate moving image data by interpolating two-dimensional images between the two two-dimensional images.

The three-dimensional data including teeth of a subject 2 can be acquired not only by an X-ray CT scanner 200 but also by a three-dimensional scanner. The three-dimensional scanner is a device that captures three-dimensional data including teeth with a built-in three-dimensional camera. The three-dimensional data captured by the three-dimensional scanner, however, does not include at least a part of the maxilla and the mandible, so that it is not possible to compare three-dimensional data captured before and after orthodontics using reference "S" as described above. For orthodontics treatment, however, there is a treatment method available in which an anchor screw is embedded in a jawbone, and a tooth is moved using the anchor screw as a fulcrum. Therefore, in a case where the anchor screw is embedded in the jawbone, a data processing device 100 can calculate the movement amount of each tooth in step S13 by further performing processing the same as described above on the three-dimensional data acquired by the three-dimensional scanner with the anchor screw as reference "S". Furthermore, the data processing device 100 can generate superimposed image data and moving image data from two-dimensional images captured before and after orthodontics, the two-dimensional images being generated from the three-dimensional data captured by the three-dimensional scanner and being viewed from any identical point.

Figure 6A:
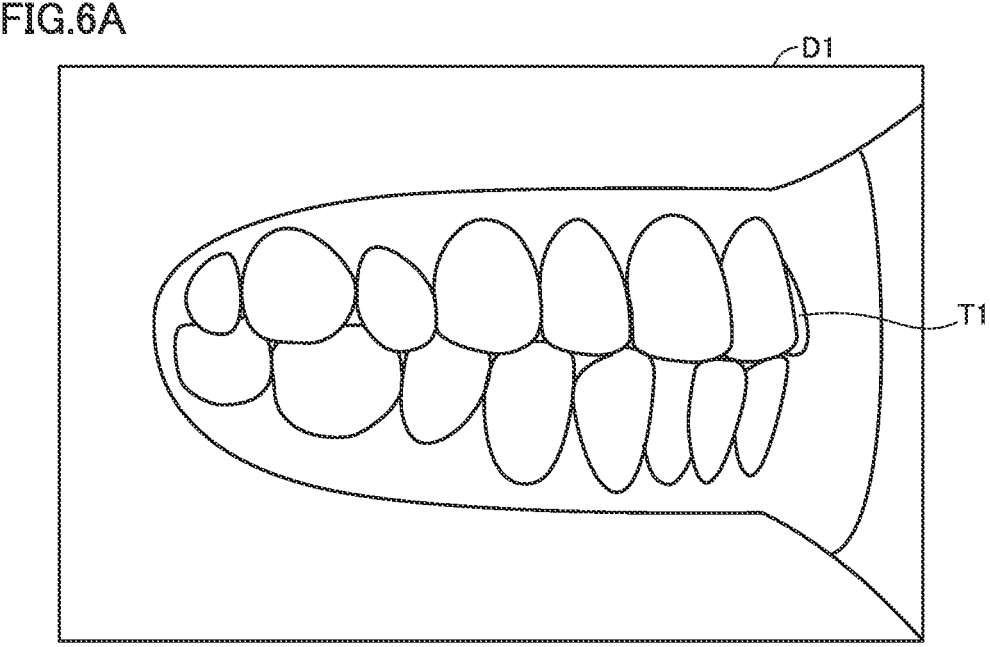
FIG. 6A is a diagram illustrating an example of moving image data (side view) generated by the data processing device according to the first embodiment.
Figure 6B:
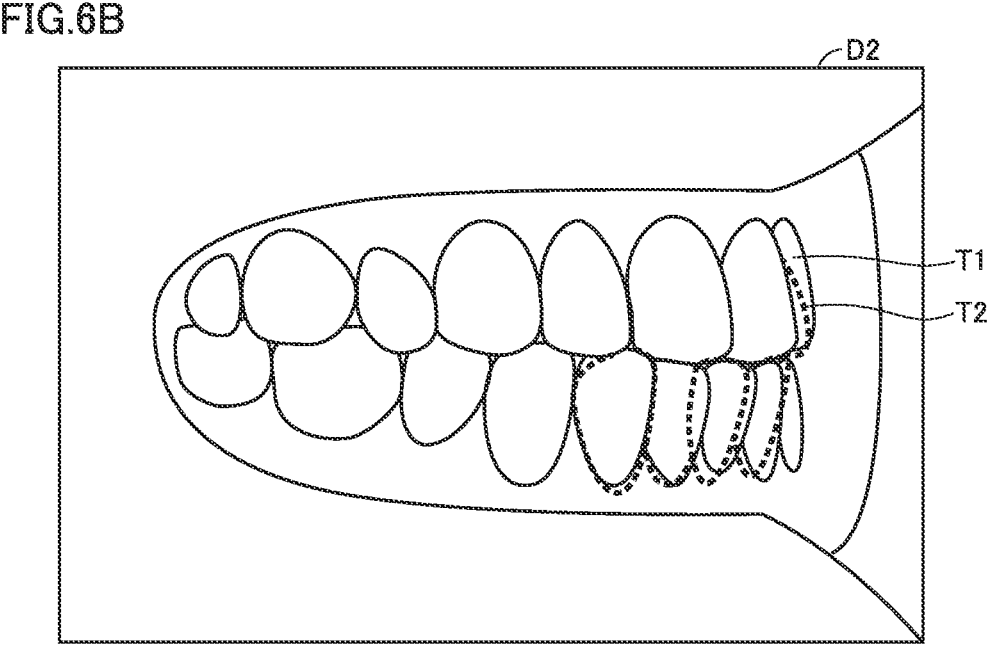
FIG. 6B is a diagram illustrating an example of moving image data (side view) generated by the data processing device according to the first embodiment.
Figure 7A:
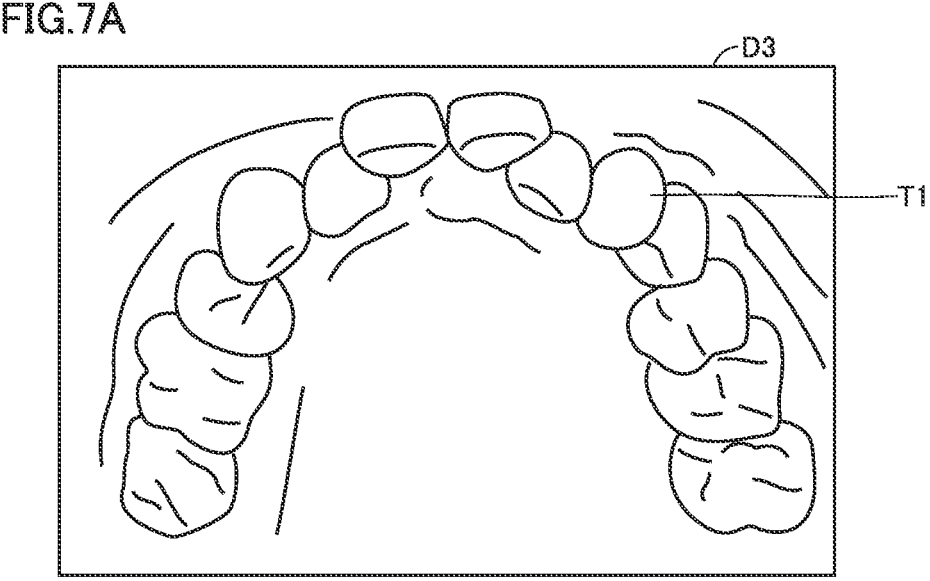
FIG. 7A is a diagram illustrating an example of moving image data (maxilla side) generated by the data processing device according to the first embodiment.
Figure 7B:
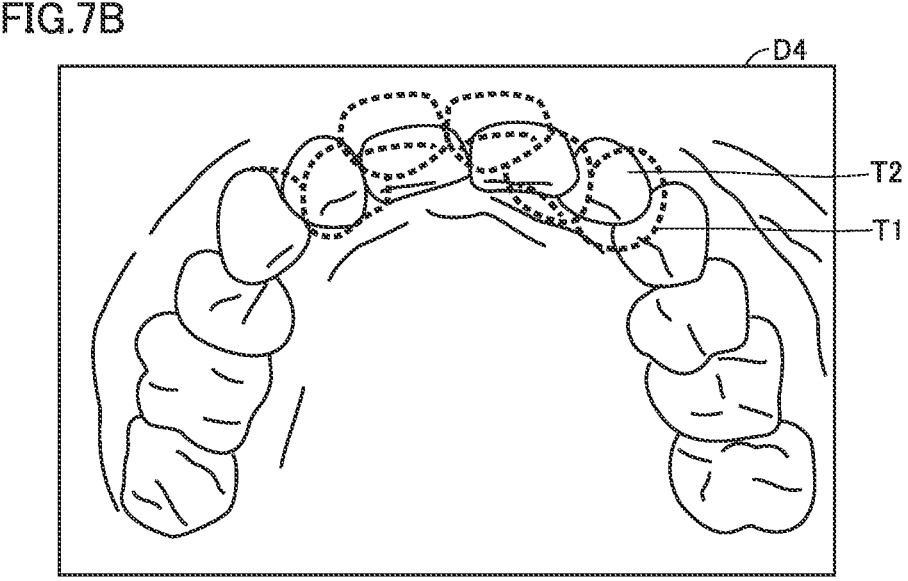
FIG. 7B is a diagram illustrating an example of moving image data (maxilla side) generated by the data processing device according to the first embodiment.
Figure 8A:
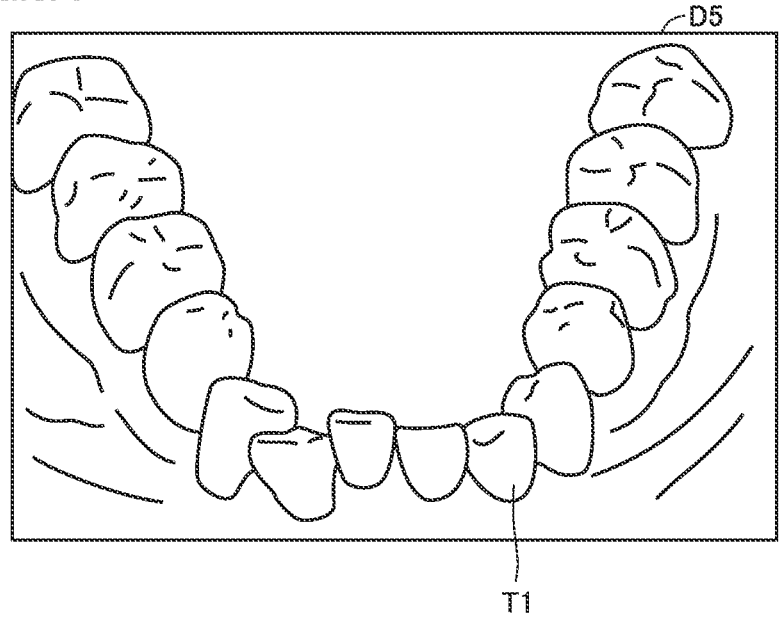
FIG. 8A is a diagram illustrating an example of moving image data (mandible side) generated by the data processing device according to the first embodiment.
Figure 8B:
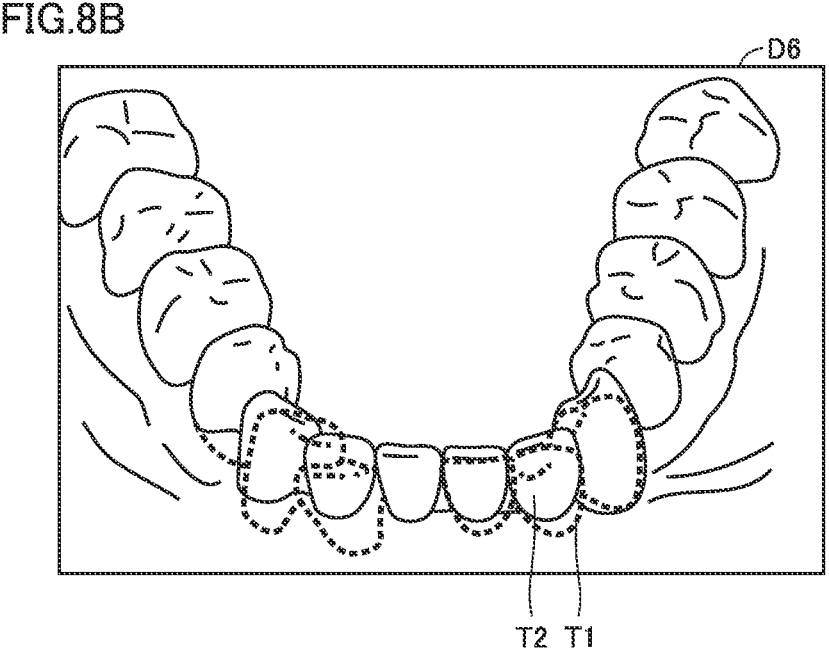
FIG. 8B is a diagram illustrating an example of moving image data (mandible side) generated by the data processing device according to the first embodiment.

An example of moving image data generated using three-dimensional data captured by the three-dimensional scanner will be described. FIGS. 6A and 6B are diagrams illustrating an example of moving image data (side surface) generated by a data processing device 100 according to the first embodiment. FIGS. 7A and 7B are diagrams illustrating an example of moving image data (maxilla side) generated by a data processing device 100 according to the first embodiment. FIGS. 8A and 8B are diagrams illustrating an example of moving image data (mandible side) generated by a data processing device 100 according to the first embodiment.

A two-dimensional image D1 illustrated in FIG. 6A is one frame of moving image data representing a two-dimensional image of a bone including teeth of a subject 2 when the subject 2, before being subjected to orthodontics, is viewed from a side point. A two-dimensional image D2 illustrated in FIG. 6B is one frame of moving image data representing a two-dimensional image of the bone including the teeth of a subject 2 when the subject 2, after being subjected to orthodontics, is viewed from the side point. In the moving image data, two-dimensional image D1 transitions to two-dimensional image D2, and in two-dimensional image D2, tooth T1 before being subjected to orthodontics is represented by a dashed line and is displayed with tooth T1 superimposed on tooth T2 after being subjected to orthodontics.

A two-dimensional image D3 illustrated in FIG. 7A is one frame of moving image data representing a two-dimensional image of a bone including teeth of a subject 2 when the maxilla side of the subject 2, before being subjected to orthodontics, is viewed from a point. A two-dimensional image D4 illustrated in FIG. 7B is one frame of moving image data representing a two-dimensional image of the bone including the teeth of a subject 2 when the maxilla side of the subject 2, after being subjected to orthodontics, is viewed from the point. In the moving image data, two-dimensional image D3 transitions to two-dimensional image D4, and in two-dimensional image D4, tooth T1 before being subjected to orthodontics is represented by a dashed line and is displayed with tooth T1 superimposed on tooth T2 after being subjected to orthodontics.

A two-dimensional image D5 illustrated in FIG. 8A is one frame of moving image data representing a two-dimensional image of a bone including teeth of a subject 2 when the mandible side of the subject 2, before being subjected to orthodontics, is viewed from a point. A two-dimensional image D6 illustrated in FIG. 8B is one frame of moving image data representing a two-dimensional image of the bone including the teeth of a subject 2 when the mandible side of the subject 2, after being subjected to orthodontics is viewed from the point. In the moving image data, two-dimensional image D5 transitions to two-dimensional image D6, and in two-dimensional image D6, tooth T1 before being subjected to orthodontics is represented by a dashed line and is displayed with tooth T1 superimposed on tooth T2 after being subjected to orthodontics.

Returning to FIG. 3, a data processing device 100 outputs the movement amount of each tooth calculated in step S14, the image data generated in step S15, and the moving image data generated in step S16 to a display 300 that is an external device (step S16). The display 300 displays the image data and the like output from data processing device 100 on a display screen. Although it has been described that a data processing device 100 calculates the movement amount of each tooth in step S14, generates the image data in step S15, and generates the moving image data in step S16, the data processing device 100 may perform processing in at least one of steps S14 to S16 and output the processing result to the display 300. Alternatively, the data processing device 100 may output the processing results of steps S14 to S16 to an external device (for example, a server device) other than a display 300.

Second Embodiment

In a data processing device 100 according to the first embodiment, two-dimensional images based on a plurality of pieces of three-dimensional data captured at different timings are compared based on reference "S". Furthermore, the position of each tooth is digitized (converted into position data) based on reference "S" whose position does not change before and after orthodontics, so as to allow the position of each tooth to be accurately managed over a period of orthodontics. In the second embodiment the process, in the data processing device 100, of digitizing the position of each tooth based on the reference, will be described. Note that components of the inspection system and the data processing device 100 according to the second embodiment are the same as the components of the inspection system 10 and data processing device 100 according to the first embodiment, so that the same components are denoted by the same reference numerals, and no detailed description will be given of such components.

Figure 9:
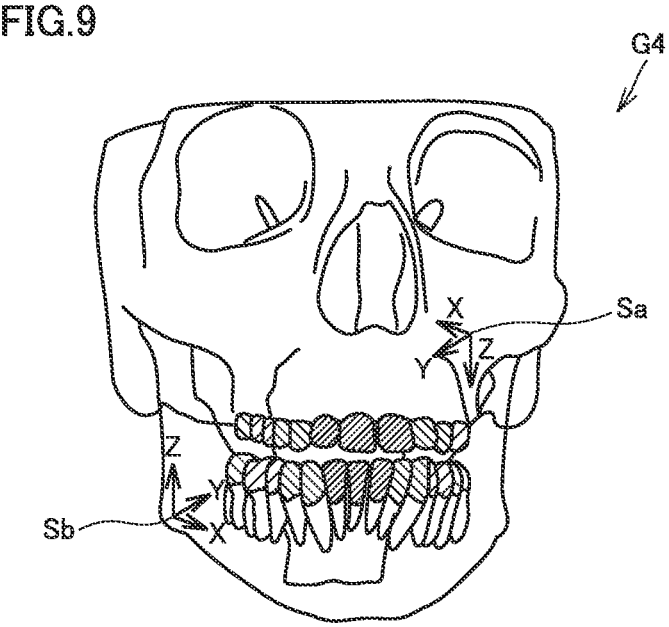
FIG. 9 is a diagram illustrating an example of three-dimensional data processed by a data processing device according to a second embodiment.

FIG. 9 is a diagram illustrating an example of three-dimensional data processed by the data processing device 100 according to the second embodiment. A two-dimensional image G4, illustrated in FIG. 9, is a two-dimensional image generated based on three-dimensional data and representing a bone including teeth of a subject 2 when the subject 2 is viewed from a front point. In two-dimensional image G4, a plurality of pieces of position information are segmented for each part, and specifically, a maxilla 2a, a mandible 2b, and a plurality of teeth are each associated with identification data so as to be distinguishable from each other. In two-dimensional image G4, a reference "Sa" and a reference "Sb" are provided on maxilla 2a and mandible 2b respectively, the positions of which do not change even when orthodontics are performed. In FIG. 9, hatching on maxilla 2a and mandible 2b is not present such that the positions of references Sa, Sb are clearly visible.

A data processing device 100 calculates position data based on reference "Sa" (first reference) provided on maxilla 2a for each tooth on the maxilla 2a side and calculates position data based on reference "Sb" (second reference), provided on mandible 2b, for each tooth on the mandible 2b side. the data processing device 100 may provide a reference on either maxilla 2a or mandible 2b and calculate the position data based on the reference for each tooth on the maxilla 2a side and each tooth on the mandible 2b side.

Figure 10:
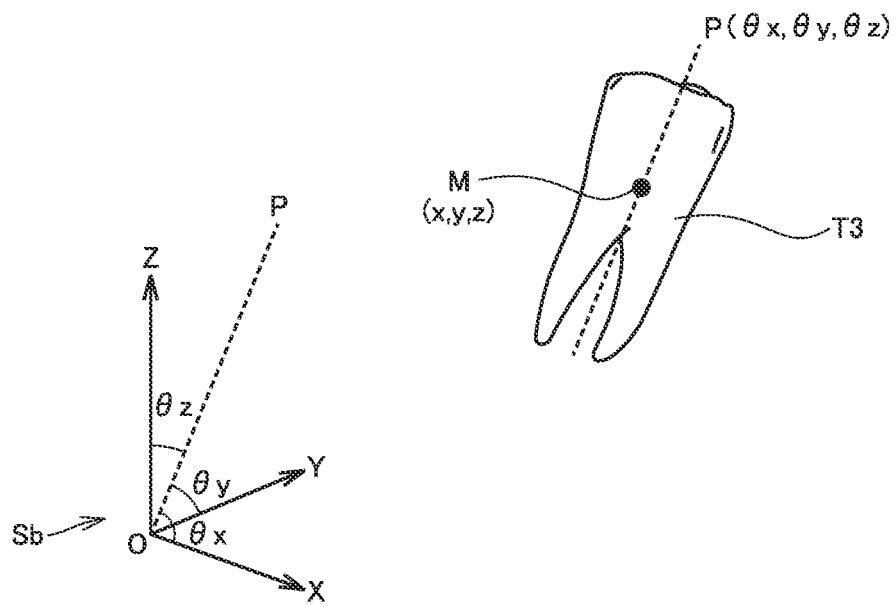
FIG. 10 is a diagram for describing tooth position data calculated by the data processing device according to the second embodiment.

FIG. 10 is a diagram for describing tooth position data calculated by a data processing device 100 according to the second embodiment. In FIG. 10, an example of calculating the position data based on reference "Sb" for each tooth on the mandible 2b side will be described, but the same applies to a case where the position data is calculated based on reference "Sa" for each tooth on the maxilla 2a side.

The tooth position data includes tooth position information and tooth axis angle information. Specifically, position information on a tooth T3 is calculated based on coordinates (x, y, z) of a barycentric position M of tooth T3 relative to reference "Sb". Note that the calculation of the position information on tooth T3 based on barycentric position M is merely an example, and the position information on tooth T3 may be calculated based on another characteristic position.

Furthermore, the position information on tooth T3 may be calculated, not from one position on each tooth, but from a plurality of positions.

The angle information on tooth T3 is calculated as angles (θx, θy, θz) formed by a tooth axis P and an x axis, a y axis, and a z axis of reference "S"b. Defining tooth T3 with the coordinates (x, y, z) and the angles (θx, θy, θz) makes the position of tooth T3 uniquely identifiable in the oral cavity. Note that tooth axis P may be determined based on any definition known in the dental field. Further, tooth position data may be defined in a manner other than coordinates (x, y, z) and angles (θx, θy, θz).

Figure 11:
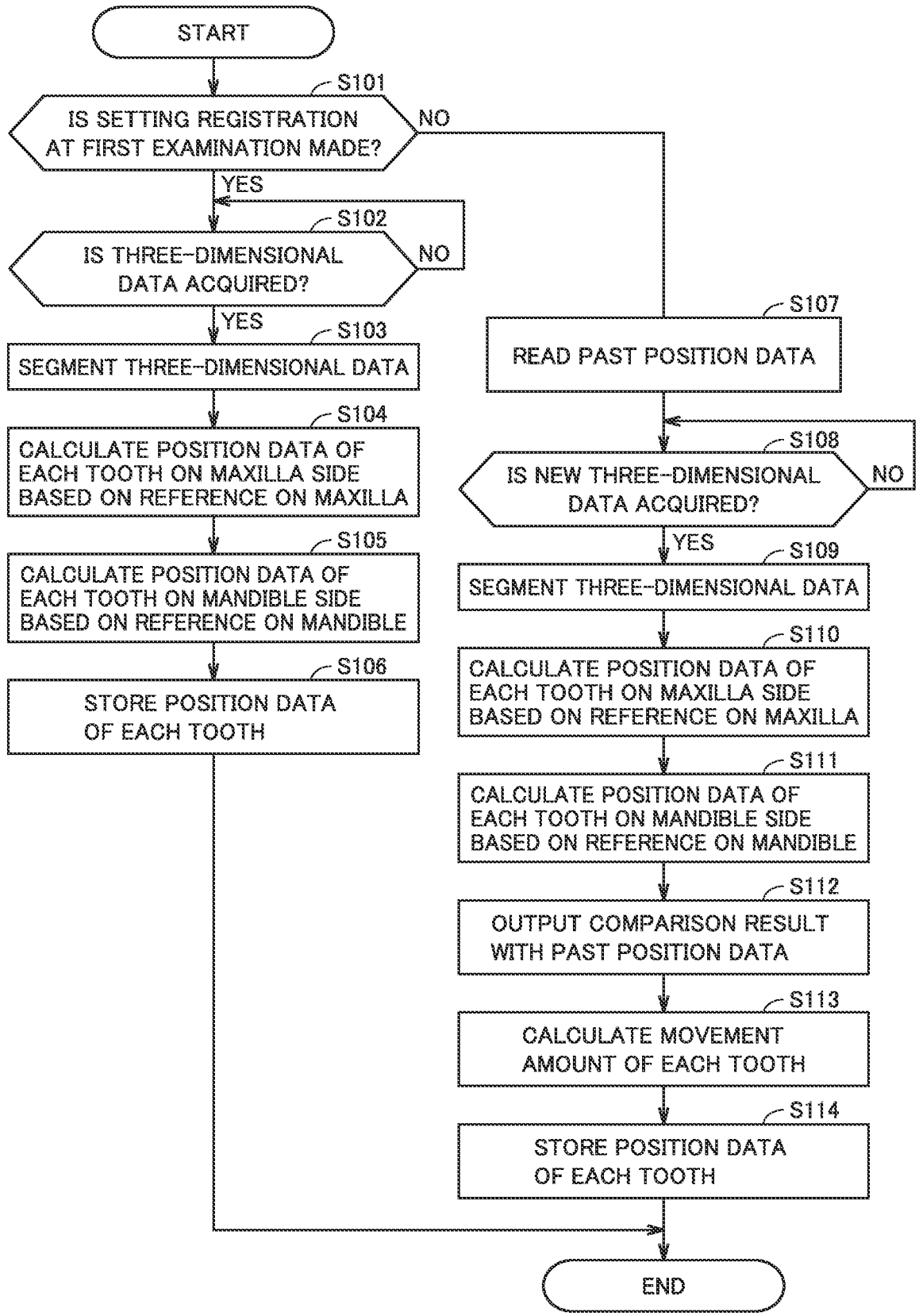
FIG. 11 is a flowchart for describing an example of data processing performed in the data processing device according to the second embodiment.

Next, the data processing which manages the position of each tooth, over a period of orthodontics, using the tooth position data will be described with reference to a flowchart. FIG. 11 is a flowchart for describing an example of data processing performed on a data processing device 100 according to the second embodiment.

First, a data processing device 100 determines whether to perform setting registration at a first orthodontics examination (step S101). Specifically, in a case where a user 1 inputs, with a keyboard 501 or the like, information indicating an intention to make the setting registration at a first orthodontics examination, the data processing device 100 determines that the setting registration at the first orthodontics examination is to be made. When the setting registration at the first orthodontics examination is made (YES in step S101), the data processing device 100 acquires three-dimensional data including teeth of the subject 2, before being subjected to orthodontics, from an X-ray CT scanner 200 (step S102).

When failing to acquire three-dimensional data (NO in step S102), the data processing device 100 returns to step S102 and goes into a state of waiting for acquisition of three-dimensional data. When succeeding in acquiring three-dimensional data (YES in step S102), the data processing device 100 segments the three-dimensional data thus acquired into at least a part of the maxilla and the mandible and a plurality of teeth (step S103). Note that when the three-dimensional data acquired from an X-ray CT scanner 200 has already been segmented, or when the three-dimensional data segmented by another software can be acquired, the data processing device 100 may skip step S103.

Next, a data processing device 100 calculates position data of each tooth on the maxilla 2a side from the three-dimensional data based on reference "Sa" provided on maxilla 2a, as illustrated in FIG. 9 (step S104). Specifically, the data processing device 100 calculates coordinates (x, y, z) and angles (θx, θy, θz) of each tooth on the maxilla 2a side.

Next, a data processing device 100 calculates position data of each tooth on the mandible 2b side from the three-dimensional data based on reference "Sb" provided on mandible 2b, as illustrated in FIG. 9 (step S105). Specifically, the data processing device 100 calculates coordinates (x, y, z) and angles (θx, θy, θz) of each tooth on the mandible 2b side.

The data processing device 100 stores the position data of each tooth calculated in steps S104 and S105 into storage 110 (step S106). This allows the data processing device 100 to easily grasp the progress of orthodontic treatment by acquiring the position data of each tooth before being subjected to orthodontics.

In a case where the setting registration at the first orthodontics examination is not made (NO in step S101), a data processing device 100 may read past position data of a subject 2 from storage 110 (step S107). Note that the past position data may comprise position data of each tooth set and registered at the first orthodontics examination and position data of each tooth acquired over a period of subsequent treatment. The data processing device 100 may acquire new three-dimensional data including teeth of the subject 2, after being subjected to orthodontics, from an X-ray CT scanner 200 (step S108).

When failing to acquire new three-dimensional data (NO in step S108), the data processing device 100 returns to step S108 and goes into a state of waiting for acquisition of three-dimensional data. When succeeding in acquiring new three-dimensional data (YES in step S108), the data processing device 100 segments the new three-dimensional data thus acquired, into at least a part of the maxilla and the mandible and a plurality of teeth (step S109). Note that when the three-dimensional data acquired from an X-ray CT scanner 200 has already been segmented, or when the three-dimensional data segmented by another software can be acquired, the data processing device 100 may skip step S109.

Next, the data processing device 100 calculates position data for each tooth on the maxilla 2a side from the new three-dimensional data based on reference "Sa" provided on maxilla 2a as illustrated in FIG. 9 (step S110). Specifically, the data processing device 100 calculates coordinates (x, y, z) and angles (θx, θy, θz) of each tooth on the maxilla 2a side.

Next, the data processing device 100 calculates position data for each tooth on the mandible 2b side from the new three-dimensional data based on reference "Sb" provided on mandible 2b as illustrated in FIG. 9 (step S111). Specifically, the data processing device 100 calculates coordinates (x, y, z) and angles (θx, θy, θz) of each tooth on the mandible 2b side.

A data processing device 100 may compare the position data of each tooth calculated in steps S110 and S111 with the past position data and output the comparison result (step S112). Specifically, the data processing device 100 outputs the comparison result to a display 300 as image data that can be displayed on the display screen of the display 300.

Figure 12:
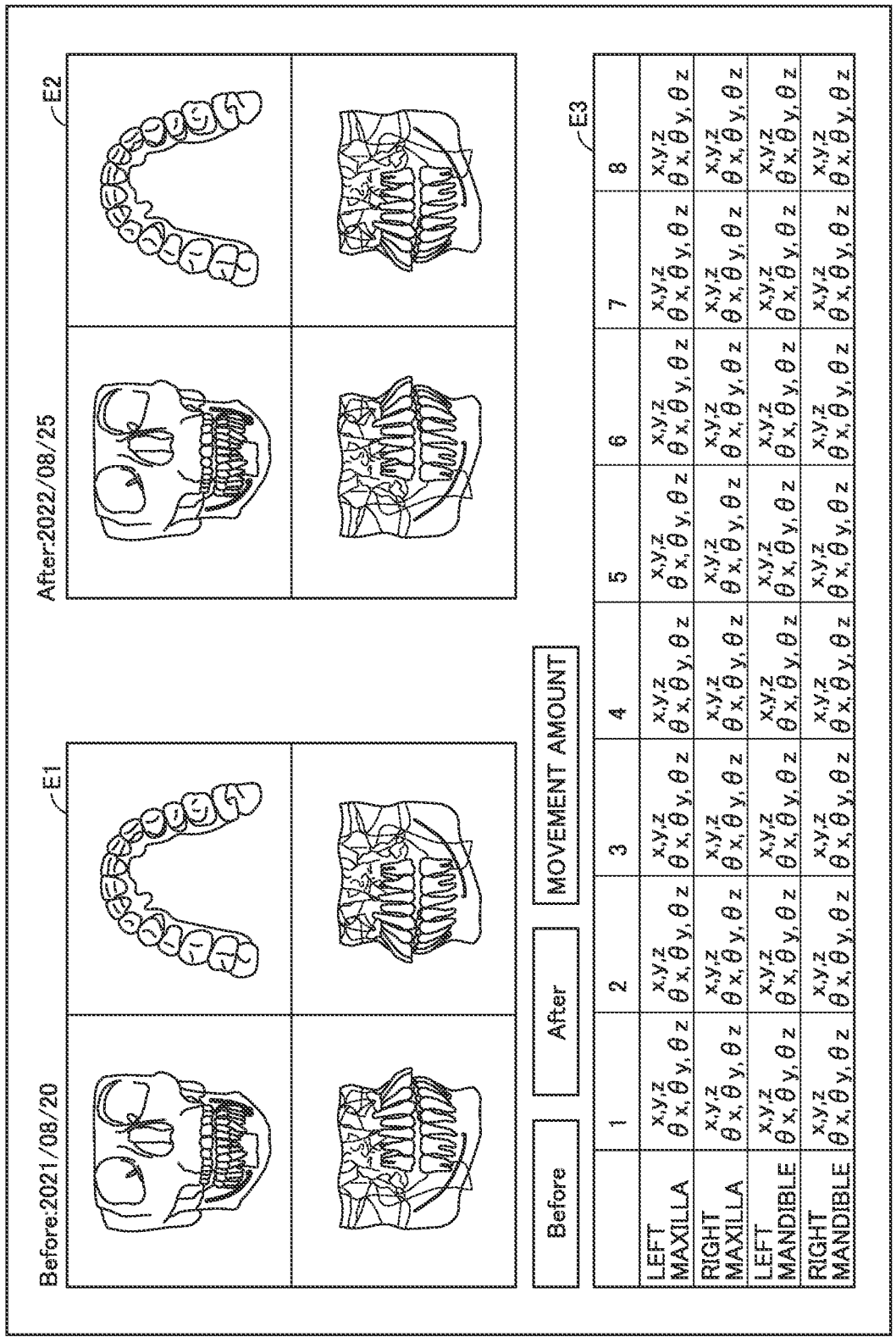
FIG. 12 is a diagram illustrating an example of a result of comparison made by the data processing device according to the second embodiment.

FIG. 12 is a diagram illustrating an example of a result of comparison made by a data processing device 100 according to the second embodiment. The comparison result illustrated in FIG. 12 includes image data E1 that is generated based on three-dimensional data of a subject 2, before being subjected to orthodontics, and represents a two-dimensional image viewed from any point, image data E2 that is generated based on three-dimensional data of the subject 2, after being subjected to orthodontics, and represents a two-dimensional image viewed from any point, and image data E3 that represents the position data of each tooth of subject 2.

Image data E1 is three-dimensional data of a subject 2 captured on "Aug. 20, 2021", and includes a CT image viewed from the front, CT images viewed from the left and right sides, and an image of a dental arch. Image data E2 is three-dimensional data of the subject 2 captured on "Aug. 25, 2021", and includes a CT image viewed from the front, CT images viewed from the left and right sides, and an image of a dental arch.

Image data E3 can be displayed in a switchable manner between the position data of each tooth based on the three-dimensional data of a subject 2 captured on "Aug. 20, 2021" and the position data of each tooth based on the three-dimensional data of the subject 2 captured on "Aug. 25, 2021". When a user 1 clicks on a "Before" button displayed on a display 300 with a mouse 502, the position data of each tooth based on the three-dimensional data of "Aug. 20, 2021" is displayed in image data E3. Further, when a user 1 clicks on an "After" button displayed on the display 300 with the mouse 502, the position data of each tooth based on the three-dimensional data of "Aug. 25, 2021" is displayed in image data E3. Note that the position data displayed in image data E3 includes coordinates (x, y, z) and angles (θx, θy, θz) of each tooth.

Furthermore, when a user 1 clicks on a "movement amount" button displayed on the display 300 with a mouse 502, a data processing device 100 calculates a difference value between the position data of each tooth based on the three-dimensional data of "Aug. 20, 2021" and the position data of each tooth based on the three-dimensional data of "Aug. 25, 2021", calculates a movement amount of each tooth, and displays the movement amount on a display 300.

Returning to FIG. 11, step S113 is processing that is performed when a user 1 clicks on the "movement amount" button displayed on a display 300 with a mouse 502. The data processing device 100 calculates a difference value between the position data of each tooth based on the new three-dimensional data and the position data of each tooth based on the past three-dimensional data and calculates the movement amount of each tooth. Note that the data processing device 100 may calculate the difference value between the position data of each tooth based on the new three-dimensional data and the position data of each tooth based on the past three-dimensional data and calculate the movement amount of each tooth even when a user 1 does not click on the "movement amount" button displayed on display 300 with mouse 502. Further, for a difference in the movement amount of each tooth, teeth may be displayed in different colors on the display 300. That is, teeth are each represented on the display in a color corresponding to the movement amount. More specifically, each tooth is made different in color in accordance with a difference in the movement amount and represented on the display 300. For example, a tooth whose movement amount has become greater than or equal to a first movement amount (for example, 1 mm) and less than a second movement amount (for example, 2 mm), as a result of orthodontics, is represented in blue on the display 300. A tooth whose movement amount has become greater than or equal to the second movement amount and less than a third movement amount (for example, 3 mm) is in yellow on the display 300. A tooth whose movement amount has become greater than or equal to the third movement amount is displayed in red on the display 300. The first movement amount, the second movement amount, and the third movement amount have a relationship of the first movement amount<the second movement amount<the third movement amount. Further, such a change in movement may be represented more minutely (for example, every 0.1 mm or every 0.5 mm). The color may change gradationally in accordance with the movement amount.

A data processing device 100 stores the position data of each tooth calculated in steps S110 and S111 into storage 110 (step S114). The data processing device 100 may store the movement amount of each tooth calculated in step S113 into storage 110. As described above, the data processing device 100 acquires the position data of each tooth, before and after being subjected to orthodontics, for a subject 2, so that it is easy to make an orthodontic treatment plan, and it is possible to accurately grasp the movement of each tooth due to the treatment.

Third Embodiment

Data processing device 100 may acquire not only the position data of each tooth before and after being subjected to orthodontics, but also occlusal contact position data. Orthodontic treatment causes the position of each tooth to change, so it is desirable to make a treatment plan with the occlusal contact position taken into account.

The occlusal contact position is identified based on three-dimensional data captured by an X-ray CT scanner 200, three-dimensional data captured by the three-dimensional scanner, jaw movement data on the position of a moving jaw, or the like. A method for identifying the occlusal contact position may be any method known in the dental field.

Figure 13:
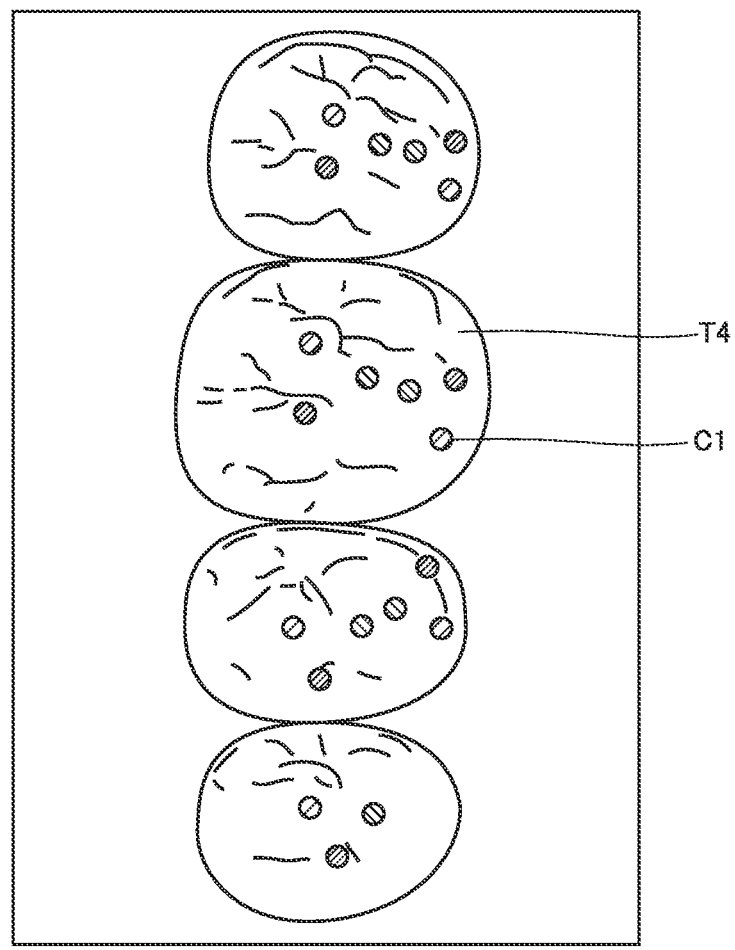
FIG. 13 is a diagram illustrating an example of occlusal contact position data processed by a data processing device according to a third embodiment.

A data processing device 100 identifies the occlusal contact position as a point and acquires data of the occlusal contact position on each tooth. FIG. 13 is a diagram illustrating an example of the occlusal contact position data processed by the data processing device 100 according to the third embodiment. In FIG. 13, occlusal contact positions on each tooth T4 are identified as a plurality of pieces of point data C1. Position information on each piece of point data C1 may also be calculated based on references "Sa", "Sb" described in the second embodiment.

The data processing device 100 stores point data C1 of the identified occlusal contact position into storage 110. With point data C1 stored in storage 110, a data processing device 100 can compare how the occlusal contact position has changed before and after orthodontics.

Figure 14:
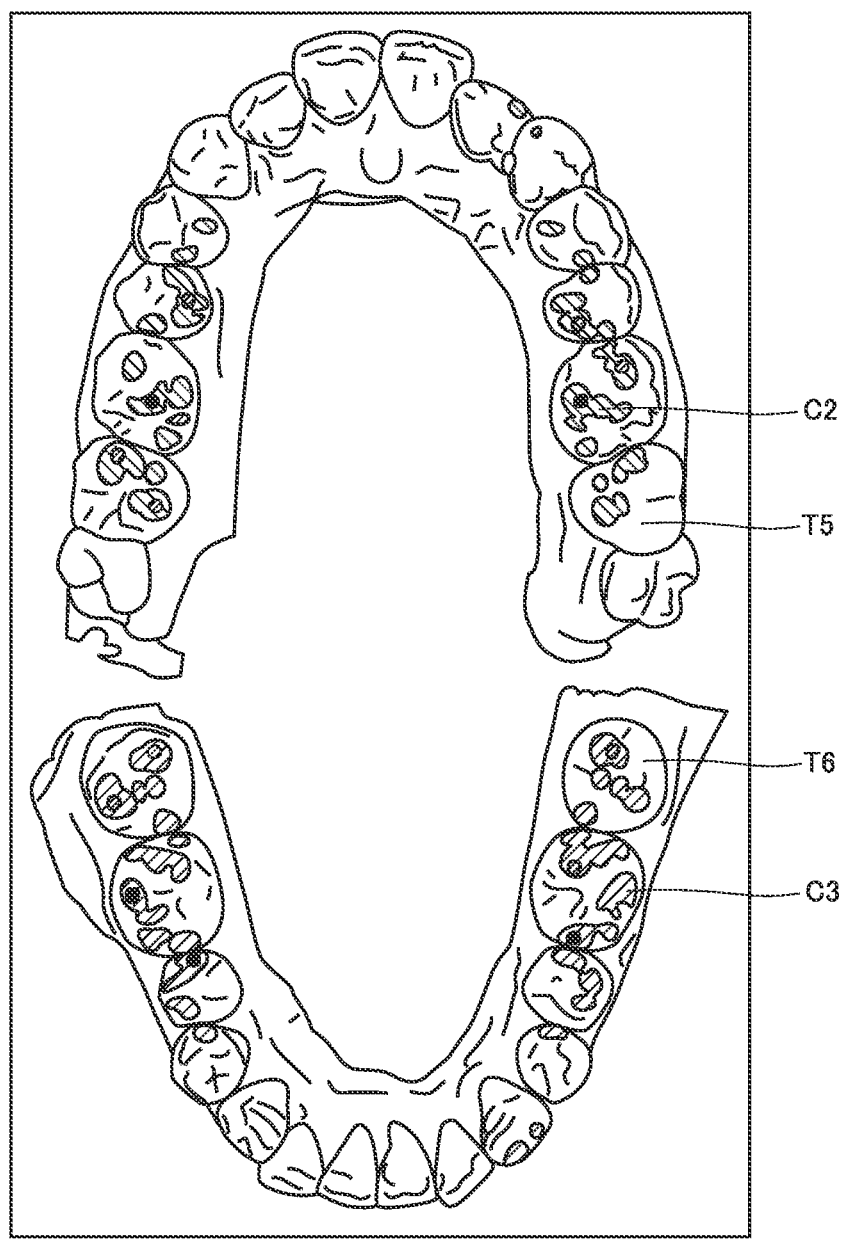
FIG. 14 is a diagram illustrating another example of the occlusal contact position data processed by the data processing device according to the third embodiment.

The occlusal contact position data is identified not only as point data C1 as illustrated in FIG. 13, but also as a pressure distribution including information on pressure applied to a tooth due to occlusal contact. FIG. 14 is a diagram illustrating another example of the occlusal contact position data processed by the data processing device 100 according to the third embodiment. In FIG. 14, occlusal contact positions on each tooth T5 on the maxilla side are identified as a plurality of pieces of area data C2, and occlusal contact positions on each tooth T6 on the mandible side are identified as a plurality of pieces of area data C3. Area data C2, C3 represents, by shading, pressure applied to a corresponding tooth due to occlusal contact. Specifically, area data C2, C3 that is dark in color indicates that pressure applied to a corresponding tooth due to occlusal contact is higher than pressure applied to area data C2 that is light in color.

Other Modifications (a) In the first to third embodiments, as illustrated in FIGS. 4A and 4B, the three-dimensional data includes data used for identifying the three-dimensional shapes of the maxilla, the mandible, and the plurality of teeth of a subject 2. Specifically, the three-dimensional data includes three-dimensional position information (coordinates on axes in the vertical direction, the horizontal direction, and the height direction) on each of the maxilla, the mandible, and the plurality of teeth. Furthermore, in the three-dimensional data, each piece of position information is segmented using identification data (for example, color information) for each type of the maxilla, the mandible, and the plurality of teeth.

(b) In the first to third embodiments, the color information is used as the identification data when the three-dimensional data is segmented, but other identification information may be used as the identification data. For example, at least one of a pattern, a character, a number, or a symbol may be used as the identification data.

(c) The three-dimensional scanner according to the first to third embodiments may be configured to acquire a three-dimensional shape using not only a technique of a focusing method, but also a technique such as a confocal method, triangulation, white light interferometry, a stereo method, photogrammetry, simultaneous localization and mapping (SLAM), or optical coherence tomography (OCT).

(d) In the first to third embodiments, the inspection system 10 in which a data processing device 100 and X-ray CT scanner 200 are connected has been described. The data processing device 100, however, is not limited to such a configuration, and a configuration where the data processing device 100 is mounted on an X-ray CT scanner 200 or a configuration where the data processing device 100 is connected to an X-ray CT scanner 200 over a network may be employed. Alternatively, the data processing device 100 may be provided in the form of a cloud service having a plurality of X-ray CT scanners 200 connected over a network.

(e) In the first embodiment described above, it has been described that two-dimensional images viewed from any identical point are generated with respect to three-dimensional data captured at different timings and compared based on reference "S", but the three-dimensional data captured at different timings may be directly compared based on reference "S" without generating the two-dimensional images.

Although the present disclosure has been described and illustrated in detail, it is clearly understood that the same is by way of illustration and example only and is not to be taken by way of limitation. The scope of the present disclosure is interpreted by the terms of the appended claims, and the present disclosure is intended to include the claims, equivalents of the claims, and all modifications within the scope.

The invention claimed is:

1. A data processing device that processes three-dimensional data of teeth, the data processing device comprising:
   an input circuit into which the three-dimensional data, including a bone of a part of a head and a plurality of teeth captured by an imaging device, is input;
   a data processing circuit configured to preform data processing based on the three-dimensional data; and
   an output circuit configured to output the three-dimensional data processed by the data processing circuit to an external device;
   wherein:
   the three-dimensional data further comprises position information and is segmented into the bone of the part of the head and the plurality of teeth;
   the three-dimensional data further comprises first three-dimensional data captured at a first timing before or after dental treatment and second three-dimensional data captured at a second timing before or after dental treatment;
   the data processing circuit is configured to execute a reference program configured to designate a reference on at least the bone of the part of the head in the first three-dimensional data, and identify the reference in the second three-dimensional data; and
   the data processing circuit is configured to compare the three-dimensional data captured at different times, based on a reference provided on at least the bone of the part of the head.

2. The data processing device according to claim 1, wherein:
   the data processing circuit is further configured to calculate a difference value between the first three-dimensional data and the second three-dimensional data.

3. The data processing device according to claim 2, wherein the data processing circuit is further configured to calculate the difference value for each tooth that is segmented.

4. The data processing device according to claim 3, wherein:
   the data processing circuit is further configured to determine a movement amount of each tooth from the difference value for each tooth calculated from the three-dimensional data captured at different times; and
   the data processing circuit is further configured to output to a display, the teeth in different colors in accordance with discrepancies in the respective movement amounts of the teeth.

5. The data processing device according to claim 1, wherein:
   the data processing circuit is further configured to generate, based on the reference provided on at least the bone of the part of the head, data to be displayed in a superimposed manner wherein the first three-dimensional data is superimposed on the second three-dimensional data.

6. The data processing device according to claim 5, wherein the data processing circuit is further configured to generate data in which a change from the first three-dimensional data to the second three-dimensional data is represented by a moving image.

7. The data processing device according to claim 1, wherein the bone of the part of the head comprises at least one of a mandible, a maxilla, a nasal bone, a zygomatic bone, a nasal cavity, a frontal bone, a temporal bone, and a temporal fossa.

8. The data processing device according to claim 7, wherein:
   a first reference and a second reference are provided on the maxilla and the mandible, respectively;
   the data processing circuit is further configured to compare the three-dimensional data based on the first reference for each tooth on a maxilla side; and
   the data processing circuit is further configured to compare the three-dimensional data based on the second reference for each tooth on a mandible side.

9. The data processing device according to claim 8, wherein:
   the data processing circuit is further configured to calculate tooth position data based on the first reference for each tooth on the maxilla side; and
   the data processing circuit is further configured to calculate tooth position data based on the second reference for each tooth on the mandible side.

10. The data processing device according to claim 9, wherein the tooth position data further comprises tooth position information and tooth axis angle information.

11. The data processing device according to claim 1, wherein the data processing circuit is further configured to calculate an occlusal contact position of each tooth from the three-dimensional data.

12. A data processing method for processing three-dimensional data of teeth, the data processing method comprising:
   inputting the three-dimensional data, including a bone of a part of a head and a plurality of teeth captured by an imaging device, to a data processing device;
   comparing the three-dimensional data captured at different timings based on a reference provided on at least the bone of the part of the head; and
   outputting the three-dimensional data subjected to the comparing to an external device;
   the three-dimensional data further comprising position information and being segmented into at least the bone of the part of the head and the plurality of teeth,
   wherein:

the three-dimensional data further comprises first three-dimensional data captured at a first timing before or after dental treatment and second three-dimensional data captured at a second timing before or after dental treatment; and the data processing device is configured to execute a reference program configured to designate the reference on at least the bone of the part of the head in the first three-dimensional data, and identify the reference in the second three-dimensional data.

13. A recording medium storing a program executed by a data processing device that processes three-dimensional data of teeth, the program comprising:

inputting, the three-dimensional data including a bone of a part of a head and a plurality of teeth captured by an imaging device, to the data processing device;

comparing the three-dimensional data captured at different timings based on a reference provided on at least the bone of the part of the head; and outputting the three-dimensional data subjected to the comparing to an external device;

the three-dimensional data further comprising position information and being segmented into at least the bone of the part of the head and the plurality of teeth, wherein:

the three-dimensional data further comprises first three-dimensional data captured at a first timing before or after dental treatment and second three-dimensional data captured at a second timing before or after dental treatment; and the data processing device is configured to execute a reference routine configured to designate the reference on at least the bone of the part of the head in the first three-dimensional data, and identify the reference in the second three-dimensional data.

14. The data processing device according to claim 2, wherein the data processing circuit is further configured to calculate an occlusal contact position of each tooth from the three-dimensional data.

15. The data processing device according to claim 3, wherein the data processing circuit is further configured to calculate an occlusal contact position of each tooth from the three-dimensional data.

16. The data processing device according to claim 4, wherein the data processing circuit is further configured to calculate an occlusal contact position of each tooth from the three-dimensional data.

17. The data processing device according to claim 5, wherein the data processing circuit is further configured to calculate an occlusal contact position of each tooth from the three-dimensional data.

18. The data processing device according to claim 6, wherein the data processing circuit is further configured to calculate an occlusal contact position of each tooth from the three-dimensional data.

19. The data processing device according to claim 1, wherein the data processing circuit is configured to calculate an amount of movement of a tooth of the plurality of teeth between the first timing and the second timing relative to the reference provided on at least the bone of the part of the head.

20. The data processing device according to claim 12, wherein the data processing device is configured to calculate an amount of movement of a tooth of the plurality of teeth between the first timing and the second timing relative to the reference provided on at least the bone of the part of the head.

* * * * *